United States Patent
Lovetro et al.

(10) Patent No.: US 7,459,005 B2
(45) Date of Patent: Dec. 2, 2008

(54) CHEMICAL COMPOSITION AND METHOD

(75) Inventors: David C. Lovetro, Marietta, GA (US); David J. Bonislawski, Powder Springs, GA (US); Laural C. Webb, Kennesaw, GA (US)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 10/301,760

(22) Filed: Nov. 22, 2002

(65) Prior Publication Data

US 2004/0101461 A1 May 27, 2004

(51) Int. Cl.
  *C01B 15/037* (2006.01)
  *C05D 9/00* (2006.01)
  *C05D 9/02* (2006.01)

(52) U.S. Cl. ............ 71/31; 47/58.1 SC; 71/903; 134/41; 422/5; 422/28; 423/272

(58) Field of Classification Search .......... 71/31–62, 71/903; 423/272; 134/41; 422/5, 28; 47/58.1 SC; 252/186.29; 510/254, 245, 269, 270, 372, 510/405

See application file for complete search history.

(56) References Cited

U.S. PATENT DOCUMENTS

| | | | |
|---|---|---|---|
| 2,782,100 A | 2/1957 | Greenspan | |
| 3,122,417 A | 2/1964 | Blaser | 23/207.5 |
| 3,234,140 A * | 2/1966 | Irani | 252/186.29 |
| 3,415,692 A | 12/1968 | Armentano | |
| 3,864,271 A * | 2/1975 | Stalter | 510/254 |
| 3,903,244 A | 9/1975 | Winkley | 423/272 |
| 3,912,490 A * | 10/1975 | Boghosian | 71/28 |
| 4,051,058 A * | 9/1977 | Bowing et al. | 424/616 |
| 4,059,678 A | 11/1977 | Winkley | |
| 4,070,442 A | 1/1978 | Watts | 423/272 |
| 4,304,762 A | 12/1981 | Leigh | 423/272 |
| 4,359,348 A | 11/1982 | Crotty | |
| 4,362,706 A * | 12/1982 | Willard | 423/273 |
| 4,378,270 A * | 3/1983 | Brasch | 216/93 |
| 4,401,509 A | 8/1983 | Schellinger, Jr. | |
| 4,606,905 A * | 8/1986 | Thirion | 423/588 |
| 4,614,646 A * | 9/1986 | Christiansen | 423/272 |
| 4,923,500 A * | 5/1990 | Sylling et al. | 71/27 |
| 5,290,361 A | 3/1994 | Hayashida et al. | |
| 5,302,311 A | 4/1994 | Sugihara et al. | |
| 5,364,549 A | 11/1994 | McDonogh | |
| 5,395,419 A * | 3/1995 | Farone et al. | 71/63 |
| 5,705,089 A * | 1/1998 | Sugihara et al. | 252/79.1 |
| 5,788,830 A | 8/1998 | Sakamoto et al. | |
| 5,817,253 A * | 10/1998 | Grimberg et al. | 252/186.29 |
| 5,837,662 A | 11/1998 | Chai et al. | |
| 5,855,622 A * | 1/1999 | Takeuchi | 8/111 |
| 5,885,953 A * | 3/1999 | Jadesjo et al. | 510/372 |
| 6,063,205 A | 5/2000 | Cooper et al. | |
| 6,126,755 A * | 10/2000 | Colgan et al. | 134/3 |
| 6,346,279 B1 * | 2/2002 | Rochon | 424/616 |
| 6,488,914 B2 * | 12/2002 | Montgomery | 424/53 |
| 6,599,370 B2 | 7/2003 | Skee | |
| 6,660,289 B1 | 12/2003 | Wilmotte et al. | |
| 6,686,324 B2 * | 2/2004 | Ramirez et al. | 510/218 |
| 6,858,097 B2 | 2/2005 | Giordani et al. | |
| 7,129,199 B2 | 10/2006 | Zhang et al. | |
| 7,176,313 B2 | 2/2007 | Takemura et al. | |
| 2003/0095917 A1 * | 5/2003 | Wilcox et al. | 423/584 |
| 2003/0119848 A1 | 6/2003 | Takemura et al. | |
| 2003/0121568 A1 | 7/2003 | Giordani et al. | |
| 2004/0053800 A1 | 3/2004 | Zhang et al. | |
| 2004/0129295 A1 | 7/2004 | Lovetro et al. | |

FOREIGN PATENT DOCUMENTS

| | | | | |
|---|---|---|---|---|
| EP | 0087049 | | 8/1983 | |
| EP | 0426949 | * | 5/1991 | 423/272 |
| EP | 0845526 | | 6/1998 | |
| JP | 5-229889 | * | 9/1993 | 71/33 |

OTHER PUBLICATIONS

Kotz et al., "Chemistry and Chemical Reactivity," 1987, two title pages and pp. 563-564.
USPTO Office Action dated Jan. 17, 2008 relating to the Continuation in Part Case U.S. Appl. No. 10/691,555.
USPTO Interview Summary dated Apr. 18, 2008 relating to the Continuation in Part Case U.S. Appl. No. 10/691,555.

* cited by examiner

*Primary Examiner*—Wayne Langel
(74) *Attorney, Agent, or Firm*—David J. Serbin; Robert C. Morriss

(57) ABSTRACT

The invention relates to an aqueous solution consisting essentially of:
(a) hydrogen peroxide;
(b) at least one compound selected from the group consisting of complexing agents based on phosphonic acids, salts and degradation products thereof in an amount from about 10 to about 60 wt % based on the amount of hydrogen peroxide;
(c) water; and
(d) components other than (a) through (c) in an amount from 0 up to about 10 wt % based on the amount of hydrogen peroxide The invention further concerns a soil oxygenation or micronutrient composition comprising hydrogen peroxide, a process for its preparation, and a process for the oxygenation of soil.

23 Claims, No Drawings

CHEMICAL COMPOSITION AND METHOD

FIELD OF THE INVENTION

The present invention relates to an aqueous solution comprising hydrogen peroxide, a soil oxygenation or micronutrient composition comprising hydrogen peroxide, a process for its preparation, and a process for the oxygenation of soil

BACKGROUND OF THE INVENTION

Solutions of hydrogen peroxide are widely used in various commercial applications, such as processes for bleaching, cleaning, disinfection, sterilization and oxidation. In most applications diluted solutions are used, normally containing from about 0.1 to about 20 wt % of hydrogen peroxide. In many cases the hydrogen peroxide is present in a formulation together with other additives, such as surfactants or the like. However, for practical and economic reasons it is desirable to produce and transport hydrogen peroxide as more concentrated solutions, generally containing from about 30 to about 80 wt % of hydrogen peroxide, which solutions can be diluted on site to a desired concentration.

Hydrogen peroxide is sensitive to impurities catalyzing its decompositions, particularly heavy metal ions, but also some organic substances. Therefore, small amounts of stabilizers are normally added to the hydrogen peroxide by the manufacturer to inhibit its decomposition. It has, however, been found that under certain conditions even hydrogen peroxide solutions containing stabilizers do not have satisfactory stability, particularly those prepared by dilution of more concentrated solutions.

U.S. Pat. Nos. 3,122,417 and 4,304,762 disclose use of certain phosphonic acids for stabilizing hydrogen peroxide. It is not recommended to add too high levels of phosphonic acids as it increases the costs and tends to give reduced activity of the hydrogen peroxide.

U.S. Pat. No. 4,070,442 teaches that in order to stabilize hydrogen peroxide in the presence of high concentrations of heavy metal ions it is necessary to add both an alkylidene di-phosphonic acid and an organic hydroxy compound.

SUMMARY OF THE INVENTION

It is an object of the invention to provide a hydrogen peroxide solution that can be used for the preparation of various formulations in which the hydrogen peroxide still has high stability It is another object of the invention to provide a hydrogen peroxide solution that can be used for the preparation of various formulations containing heavy metal ions or organic materials in high concentrations It is still another object of the invention to provide a hydrogen peroxide solution containing significant amounts of as few additives as possible.

It is a further object of the invention to provide a micronutrient composition comprising hydrogen peroxide of satisfactory stability.

It is still a further object of the invention to provide a process for the oxygenation of soil.

DESCRIPTION OF THE INVENTION

One aspect of the invention concerns an aqueous solution consisting essentially of.
(a) hydrogen peroxide, preferably in an amount from about 20 to about 70 wt %, most preferably from about 25 to about 55 wt %, based on the entire solution;
(b) at least one compound selected from the group consisting of complexing agents based on phosphonic acids, salts and degradation products thereof in an amount from about 10 to about 60 wt %, preferably from about 20 to about 50 wt %, most preferably from about 35 to about 45 wt %, based on the amount of hydrogen peroxide;
(c) water; and,
(d) components other than (a) through (c) in an amount from 0 up to about 10 wt %, preferably from 0 up to about 5 wt %, most preferably from 0 up to about 2 wt %, particularly most preferably from 0 up to about 1 wt %, based on the amount of hydrogen peroxide.

The pH of the solution is suitably below 7, preferably from about 0 to about 6, most preferably from about 0.5 to about 5.

The complexing agent may be based on various phosphonic acids, salts and degradation products thereof. Examples of such phosphonic acids include 1-hydroxyethylidene-1,1-diphosphonic acid, 1-aminoethane-1,1-diphosphonic acid, aminotri (methylenephosphonic acid), ethylene diamine tetra (methylenephosphonic acid), hexamethylene diamine tetra (methylenephosphonic acid), diethylenetriamine penta (methylenephosphonic acid) and diethylenetriamine hexa (methylenephosphonic acid). 1-hydroxyethylidene-1,1-diphosphonic acid is particularly preferred.

Degradation products as used herein refer to compounds formed by reactions between phosphonic acids or salts thereof with hydrogen peroxide and/or other components in the solution. Salt usually include alkali metal salts, e.g. of sodium or potassium, but also other metal salts are possible.

Components other than (a) through (c) may include low concentrations of various additives and degradation products thereof, as well as impurities, particularly those originating from the hydrogen peroxide production process. Examples of additives usually added at the production or shortly after include phosphoric acid, pyrophosphates, phosphonic acids and their suits butane diols, phenol sulfonates, alkali metal stannate and alkali metal nitrate. Examples of impurities include metal ions (particularly heavy metal ions) and organic residues, eg. originating from the working solution of the anthraquinone process.

As only a few components in the hydrogen peroxide solution of the invention are present in significant amounts, the solution can be used for the preparation of a great variety of formulations with different additives Such formulations may, for example, be those suitable for cleaning, disinfection, sterilization, bleaching, odor control, cleaning and passivating metals (e.g. copper or iron), or as a micronutrient and/or other soil treatment compositions. The formulations may comprise various additives and impurities, such as mineral acids (eg sulfuric acid, phosphoric acid, nitric acid or hydrochloric acid), surfactants, detergent builders, alkali metal silicate, alkali metal carbonate, dyes and metal ions. A formulation comprising a solution of the invention combined with sulfuric acid has been found particularly useful for metal cleaning as it does not destroy the metal.

Examples of surfactants that can be used in formulations prepared from a hydrogen peroxide solution of the invention include non-ionic, amphoteric, an-ionic and cat-ionic surfactants. Non-ionic surfactants are preferred and may, for example, include one or more of ethoxylated and/or propoxylated fatty acids, alcohols, amines or amides, preferably comprising from 1 to 12 most preferably from 4 to 8 mols ethylene oxide and/or propylene oxide per mol acid, alcohol, amine or amide. Preferably the acid, alcohol or amide comprises from 7 to 15, most preferably from 9 to 11 carbon atoms. Useful non-ionic surfactants can be high foaming such as an ethoxylated alcohol containing 11 carbon atoms and 8 ethylene oxides, or low foaming such as a narrow range ethoxylated alcohol containing 9 carbon atoms and 6 ethylene oxides.

Further surfactants may include alkyl polyglucosides and other carbohydrate derivatives.

Some formulations, like micronutrient or other soil treatment compositions, may include high concentrations of heavy metal ions, such as one or more mono- or polyvalent ions comprising Fe, Cu, Mn, Mo or Zn. The hydrogen peroxide solution of the invention is particularly advantageous for preparing formulations comprising more than about 0.005 wt %, preferably from about 0.01 to about 5 wt % of Fe, and/or more than about 0.0001 wt %, preferably from about 0.0005 to about 1 wt % of Cu, and/or more than about 0.002 wt %, preferably from about 0.005 to about 3 wt % of Mn, and/or more than about 0.000001 wt %, preferably from about 0.000005 to about 0.1 wt % of Mo, and/or more than about 0.005 wt %, preferably from about 0.01 to about 6 wt % of Zn.

One aspect of the invention relates to a soil oxygenating or micronutrient composition comprising:
(a) hydrogen peroxide, preferably in an amount from about 0.1 to about 20 wt %, most preferably from about 1 to about 10 wt % based on the entire composition;
(b) at least one compound selected from the group consisting of phosphonic acid based complexing agents, salts and degradation products thereof in an amount from about 10 to about 60 wt %, preferably from about 20 to about 50 wt %, most preferably from about 35 to about 45 wt %, based on the amount of hydrogen peroxide; and,
(c) at least one metal selected from the group consisting of:
  (i) Fe in an amount of at least 0.005 wt % preferably from about 0.01 to about 5 wt %, based on the entire composition
  (ii) Mn in an amount of at least 0.002 wt % preferably from about 0.005 to about 3 wt %, based on the entire composition;
  (iii) Cu in an amount of at least 0.0001 wt % preferably from about 0.0005 to about 1 wt %, based on the entire composition;
  (iv) Mo in an amount of at least 0.000001 wt %, preferably from about 0.000005 to about 0.1 wt %, based on the entire composition; and,
  (v) Zn in an amount of at least 0.005 wt % preferably from about 0.01 to about 6 wt %, based on the entire composition.

The metals are normally present as salts, usually dissolved in water, but may also be in their elemental forms or be included in various inorganic or organic compounds or complexes. In the case the metals are present as salts, these usually comprise sulfates, chlorides, nitrates, borates or molybdates of metals or ammonium The composition may also comprise various inorganic and/or organic additives or impurities. Regarding preferred complexing agents under (b), the description of the hydrogen peroxide solution of the invention is referred to.

The composition is useful oxygenation and/or supply of trace elements to the soil It has surprisingly been found that in spite of a very high heavy metal content the stability against decomposition of the hydrogen peroxide is satisfactory A further aspects of the invention relates to a process for the preparation of a soil oxygenating composition as described above, comprising a step of adding an aqueous solution comprising hydrogen peroxide, preferably in an amount from about 20 to about 70 wt %, most preferably from about 25 to about 55 wt %, based on the entire solution, and at least one compound selected from the group consisting of complexing agents based on phosphonic acids, salts and degradation products thereof in an amount from about 10 to about 60 wt %, preferably from about 20 to about 50 wt %, most preferably from about 35 to about 45 wt %, based on the amount of hydrogen peroxide, to a composition comprising at least one metal selected from the group consisting of Fe, Mn, Cu, Mo and Zn. It is particularly preferred to use a hydrogen peroxide solution as earlier described herein.

Still a further object of the invention relates to a process for oxygenating soil comprising a step of adding to the soil a composition as described above. Preferably the final composition is prepared on-site by mixing an aqueous solution comprising hydrogen peroxide and at least one compound selected from the group consisting of complexing agents as described above to a composition comprising at least one metal selected from the group consisting of Fe, Mn, Cu, Mo and Zn.

In accordance with the invention, it is also possible to provide a kit of parts including, in separate containers, an aqueous solution comprising hydrogen peroxide and a phosphonic acid based complexing agent, and a micronutrient composition comprising at least one metal selected from the group consisting of Fe, Mn, Cu. Mo and Zn. The aqueous hydrogen peroxide solution and the micronutrient composition may then be mixed as described above to obtain a soil oxygenating or micronutrient composition of the invention, preferably as short time as possible prior to use of the resulting composition, which preferably is composed as described earlier herein The invention will be further described in connection with the following examples, which, however, are not intended to limit the scope thereof. Unless otherwise stated, all parts and percentages refer to parts and percent by weight.

EXAMPLE 1

A test was made to monitor the stability at room temperature of surfactant containing formulations made from three different concentrated aqueous solutions of hydrogen peroxide: "Grade I", a conventional 50 wt % $H_2O_2$ solution containing about 175 mg/L phosphonic acid based complexing agents and about 500 mg/L sodium nitrate; "Grade II", a conventional 50 wt % $H_2O_2$ solution containing about 175 mg/L phosphonic acid based complexing agents, about 500 mg/L sodium nitrate, about 1000 mg/L phosphoric acid and about 100 mg/L sodium stannate, "Grade III", an aqueous hydrogen peroxide solution according to the invention containing 31.5 wt % $H_2O_2$, 15.65 wt % 1-hydroxyethylidene-1, 1-diphosphonic acid, less than 175 mg/L of other phosphonic acid based complexing agents and less than 500 mg/L sodium nitrate.

Formula A was composed of 5 wt % Berol® 840 (low foaming nonionic narrow-range ethoxylated alcohol), 10 wt % Berol® CHLF (a low foaming cationic hydrotropic co-surfactant), 30 wt % $H_3PO_4$, hydrogen peroxide solution as defined above to give a $H_2O_2$ concentration of 5 wt %, and water up to 100%

Formula B was composed of 5 wt % Berol® DGR 81 (blend of nonionic surfactants based on alkyl glucoside and alcohol ethoxylate), 5 wt % Berol® LFG 61 (blend of nonionic surfactants based on alkyl glucoside and alcohol ethoxylate), 30 wt % $H_3PO_4$, hydrogen peroxide solution as defined above to give a $H_2O_2$ concentration of 5 wt %, and water up to 100%.

For each formula and each of the three hydrogen peroxide solutions 500 grams was made up and divided into 100 gram aliquots. To each aliquot doping solution (containing 500 mg/mL iron, 12.5 mg/mL copper) was added. For Formula A 10 mL was added and Formula B 2.4 mL was added. The initial $H_2O_2$ concentration was determined before the addition of the doping solution. After doping the samples were checked for $H_2O_2$ concentration after 24, & 48 hours plus 3, 6 & 10 days at room temperature. The $H_2O_2$ concentration was determined by the Iodometric Titration Method. The results are shown in the table below.

| Formula | Type H$_2$O$_2$ Used | Initial H$_2$O$_2$ g/L | H$_2$O$_2$ g/L After 24 hrs. | H$_2$O$_2$ g/L After 48 hrs. | H$_2$O$_2$ g/L After 3 Days | H$_2$O$_2$ g/L After 6 Days | H$_2$O$_2$ g/L After 10 Days | % Decomp |
|---|---|---|---|---|---|---|---|---|
| A | Grade I | 58.22 | 48.6 | 47.91 | 47.84 | 45.99 | 47.38 | 18.62 |
|  |  | 58.32 | 48.72 | 47 83 | 47.81 | 45.84 | 47.06 | 19 31 |
| Aver. |  | 58.27 | 48.66 | 47.87 | 47.83 | 45.92 | 47.22 | 18.97 |
|  | Grade II | 59.37 | 49.2 | 48.45 | 47.33 | 46.55 | 45.63 | 23 14 |
|  |  | 59.49 | 49 26 | 48 81 | 47 78 | 46.7 | 45.63 | 23.3 |
| Aver. |  | 59.43 | 49.23 | 48.63 | 47 56 | 46.63 | 45 63 | 23.22 |
|  | Grade III | 54.62 | 47 38 | 47.05 | 45.81 | 44 9 | 43.19 | 20 93 |
|  |  | 54.74 | 47.4 | 47.15 | 46.14 | 45.11 | 43 38 | 20.75 |
| Aver. |  | 54.68 | 47.39 | 47.1 | 45 98 | 45.01 | 43.34 | 20.84 |
| B | Grade I | 57.74 | 53.76 | 53.68 | 51.59 | 52.04 | 51.36 | 11 05 |
|  |  | 57.22 | 52.89 | 52 94 | 51.61 | 52 19 | 51.05 | 10 78 |
| Aver. |  | 57 48 | 53.33 | 53 31 | 51.6 | 52.12 | 51.21 | 10.92 |
|  | Grade II | 57.03 | 53.18 | 52.54 | 50.49 | 51.58 | 51 02 | 10.54 |
|  |  | 57.01 | 52 8 | 52.44 | 50 56 | 50.8 | 50.76 | 10.96 |
| Aver. |  | 57.02 | 52.99 | 52.49 | 50.53 | 51 9 | 50.89 | 10.75 |
|  | Grade III | 54.31 | 51.94 | 51.97 | 48.89 | 50.34 | 49.64 | 8.6 |
|  |  | 54.16 | 51.47 | 50.92 | 48.81 | 49.32 | 49 69 | 8.25 |
| Aver. |  | 54.24 | 51.71 | 51.45 | 48.85 | 49.83 | 49.67 | 8 43 |

It appears that in formulations with moderate heavy metal contamination the difference between the hydrogen peroxide solutions is small.

EXAMPLE 2

A test was made to monitor the stability at room temperature of soil treatment compositions made from hydrogen peroxide solutions Grade I and Grade II as defined in Example 1. A concentrated micronutrient containing 2.00% iron, 0.5% magnesium, 0.0005% molybdenum, 3.00% zinc, 3.00% sulfur, and 1.00% manganese was diluted by taking 2 ounces (56.70 grams) of it to 1 quart of DI water (946.30 grams). A first formulation was with 48.85 grams of hydrogen peroxide solution Grade I plus 452.60 grams of diluted micronutrient solution thoroughly mixed and divided into 5 100 gram aliquots. A second formulation was with 79.85 grams of hydrogen peroxide solution Grade III plus 421.65 grams of diluted micronutrient solution thoroughly mixed and divided into 5 100 gram aliquots. The H$_2$O$_2$ concentration was checked via iodometric titration initially, after 30 Minutes, 1,1½, 2, 3, 4, 5 and 18 hours plus 20 days and 1 month in room temperature. The results are shown in the table below:

After 20 days the formulation according to the invention still contained 10.35 g/L H$_2$O$_2$ on average and after 1 month 3.49 g/L H$_2$O$_2$ on average.

It appears that the composition of the invention has outstanding stability compared to the composition prepared from the conventional hydrogen peroxide Grade I.

The invention claimed is:

1. An aqueous solution consisting of:
   (a) hydrogen peroxide in an amount from about 20 to about 70 wt %, based on the entire solution;
   (b) at least one compound selected from the group consisting of 1-hydroxyethylidine-1,1-diphosphonic acid, salts and degradation products thereof in an amount from about 10 to about 60 wt % based on the amount of hydrogen peroxide;
   (c) water; and
   (d) components other than (a) through (c) in an amount from 0 up to about 10 wt %, based on the amount of hydrogen peroxide.

2. A solution as claimed in claim 1, wherein the amount of component (b) is from about 20 to about 50 wt %, based on the amount of hydrogen peroxide.

| Sample | Initial H$_2$O$_2$ g/L | H$_2$O$_2$ g/L After 30 min. | H$_2$O$_2$ g/L After 1 hr. | H$_2$O$_2$ g/L After 1.5 hrs. | H$_2$O$_2$ g/L After 2 hrs. | H$_2$O$_2$ g/L After 3 hrs. | H$_2$O$_2$ g/L After 4 hrs. | H$_2$O$_2$ g/L After 5 hrs. | H$_2$O$_2$ g/L After 18 hrs. |
|---|---|---|---|---|---|---|---|---|---|
| Tech. gr. | 48.5 | 0 66 | 0.68 | 0.51 | 0.65 | 0.51 | 0.48 | 0.48 | 0.48 |
|  | 49.11 | 0.66 | 0.6 | 0.48 | 0.73 | 0.51 | 0.49 | 0.49 | 0.48 |
|  |  | 0.66 | 0.58 | 0.48 | 0.58 | 0.48 | 0.48 | 0.48 | 0 48 |
|  |  | 0.63 | 0 6 | 0.48 | 0.58 | 0.48 | 0.48 | 0 49 | 0.46 |
|  |  | 0.63 | 0.6 | 0 49 | 0.49 | 0.48 | 0.48 | 0.46 | 0 48 |
| Average | 48.81 | 0.65 | 0.61 | 0.49 | 0.61 | 0.49 | 0.48 | 0 48 | 0.48 |
| Invention | 40.76 | 40 49 | 40.73 | 40 49 | 40.23 | 40.32 | 40.56 | 40.17 | 40 71 |
|  | 41.65 | 40.52 | 40.9 | 40 23 | 40.22 | 40 32 | 40.59 | 40 44 | 40 29 |
|  |  | 40.32 | 40.56 | 40.13 | 40.22 | 40.13 | 40.29 | 40.22 | 40.68 |
|  |  | 40.63 | 40.9 | 40.27 | 40.08 | 40 15 | 40.46 | 40.32 | 40.29 |
|  |  | 40.52 | 40 49 | 40.34 | 40.15 | 40.1 | 40.27 | 40.32 | 40.41 |
| Average | 41.21 | 40.5 | 40 72 | 40.29 | 40 18 | 40.2 | 40.43 | 40 29 | 40.48 |

3. A solution as claimed in claim 2, wherein the amount of component (b) is from about 35 to about 45 wt % based on the amount of hydrogen peroxide.

4. A solution as claimed in claim 1, wherein the amount of components other than (a) through (c) is up to about 5 wt % based on the amount of hydrogen peroxide.

5. A solution as claimed in claim 4, wherein the amount of components other than (a) through (c) is up to about 2 wt % based on the amount of hydrogen peroxide.

6. A solution as claimed in claim 5, wherein the amount of components other than (a) through (c) is up to about 1 wt % based on the amount of hydrogen peroxide.

7. A solution as claimed in claim 1, wherein the pH is below 7.

8. A solution as claimed in claim 7, wherein the pH is from about 0 to about 6.

9. A solution as claimed in claim 3, wherein the amount of components other than (a) through (c) is up to about 1 wt % based on the amount of hydrogen peroxide.

10. A soil oxygenating or micronutrient composition comprising:
    (a) hydrogen peroxide;
    (b) at least one compound selected from the group consisting of 1-hydroxyethylidine-1,1-diphosphonic acid, salts and degradation products thereof in an amount from about 10 to about 60 wt % based on the amount of hydrogen peroxide; and,
    (c) at least one metal selected from the group consisting of:
        (i) Fe in an amount of at least 0.005 wt % based on the entire composition;
        (ii) Mn in an amount of at least 0.002 wt % based on the entire composition;
        (iii) Mo in an amount of at least 0.000001 wt % based on the entire composition; and
        (iv) Zn in an amount of at least 0.005 wt % based on the entire composition.

11. A soil oxygenating or micronutrient composition as claimed in claim 10, wherein the amount of hydrogen peroxide is from about 0.1 to about 20 wt % of the entire composition.

12. A soil oxygenating or micronutrient composition as claimed in claim 10, wherein the amount of component (b) is from about 20 to about 50 wt %, based on the amount of hydrogen peroxide.

13. A process for the preparation of a soil oxygenating or micronutrient composition comprising a step of adding an aqueous solution comprising hydrogen peroxide and at least one compound selected from the group consisting of 1-hydroxyethylidine-1,1-diphosphonic acid, salts and degradation products thereof in an amount from about 10 to about 60 wt % based on the amount of hydrogen peroxide, to a composition comprising at least one metal selected from the group consisting of Fe, Mn, Mo and Zn.

14. A process for oxygenating soil comprising a step of adding to the soil a composition comprising:
    (a) hydrogen peroxide;
    (b) at least one compound selected from the group consisting of 1-hydroxyethylidine-1,1-diphosphonic acid, salts and degradation products thereof in an amount from about 10 to about 60 wt % based on the amount of hydrogen peroxide; and,
    (c) at least one metal selected from the group consisting of:
        (i) Fe in an amount of at least 0.005 wt % based on the entire composition;
        (ii) Mn in an amount of at least 0.002 wt % based on the entire composition;
        (iii) Cu in an amount of at least 0.0001 wt % based on the entire composition; (iv) Mo in an amount of at least 0.000001 wt % based on the entire composition; and,
        (v) Zn in an amount of at least 0.005 wt % based on the entire composition.

15. A process for oxygenating soil as claimed in claim 14, wherein the amount of component (b) is from about 20 to about 50 wt %, based on the amount of hydrogen peroxide, and wherein the amount of hydrogen peroxide is from about 0.1 to about 20 wt % of the entire composition.

16. A solution as claimed in claim 1, wherein the aqueous solution contains: (1) less than 175 mg/L of one or more phosphonic acid based complexing agents other than said 1-hydroxyethylidine-1,1-diphosphonic acid, salts and degradation products thereof; and (2) less than 500 mg/L sodium nitrate.

17. A cleaning solution comprising:
    (a) a stabilized hydrogen peroxide solution consisting of:
        (i) hydrogen peroxide in an amount from about 20 to about 70 wt %, based on the entire solution;
        (ii) at least one compound selected from the group consisting of 1-hydroxyethylidine-1,1-diphosphonic acid, salts and degradation products thereof in an amount from about 10 to about 60 wt % based on the amount of hydrogen peroxide;
        (iii) water; and
        (iv) components other than (i) through (iii) in an amount from 0 up to about 10 wt %, based on the amount of hydrogen peroxide; and
    (b) at least one non-ionic surfactant.

18. A cleaning solution as claimed in claim 17, wherein the amount of component (ii) is from about 20 to about 50 wt %, based on the amount of hydrogen peroxide.

19. A cleaning solution as claimed in claim 18, wherein the amount of component (ii) is from about 35 to about 45 wt % based on the amount of hydrogen peroxide.

20. A cleaning solution as claimed in claim 17, wherein the amount of components other than (i) through (iii) is up to about 5 wt % based on the amount of hydrogen peroxide.

21. A cleaning solution as claimed in claim 20, wherein the amount of components other than (i) through (iii) is up to about 2 wt % based on the amount of hydrogen peroxide.

22. A cleaning solution as claimed in claim 21, wherein the amount of components other than (i) through (iii) is up to about 1 wt % based on the amount of hydrogen peroxide.

23. A cleaning solution as claimed in claim 17, wherein the pH of said stabilized hydrogen peroxide solution is below 7.

* * * * *